United States Patent
Manther et al.

(10) Patent No.: US 9,879,573 B2
(45) Date of Patent: Jan. 30, 2018

(54) MULTI-POSITION CAMSHAFT PHASER WITH TWO ONE-WAY WEDGE CLUTCHES AND VISCOUS DAMPING

(71) Applicant: Schaeffler Technologies AG & Co. KG, Herzogenaurach (DE)

(72) Inventors: Debora Manther, Royal Oak, MI (US); John Stallmann, Washington, MI (US); Philip George, Wooster, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 135 days.

(21) Appl. No.: 15/085,503

(22) Filed: Mar. 30, 2016

(65) Prior Publication Data

US 2017/0284239 A1    Oct. 5, 2017

(51) Int. Cl.
*F01L 1/34*    (2006.01)
*F01L 1/344*    (2006.01)

(52) U.S. Cl.
CPC ......... *F01L 1/3442* (2013.01); *F01L 1/34409* (2013.01); *F01L 2001/34423* (2013.01); *F01L 2001/34463* (2013.01); *F01L 2001/34479* (2013.01)

(58) Field of Classification Search
CPC .............. F01L 1/3442; F01L 1/34409; F01L 2001/34423; F01L 2001/34463; F01L 2001/34479

USPC ........................................ 123/90.15, 90.17
See application file for complete search history.

(56) References Cited

U.S. PATENT DOCUMENTS

| 8,555,836 | B2 | 10/2013 | David et al. |
| 8,950,371 | B2 * | 2/2015 | Schaefer ................ F01L 1/344 123/90.17 |
| 2014/0007830 | A1 | 1/2014 | Schaefer et al. |

* cited by examiner

*Primary Examiner* — Ching Chang
(74) *Attorney, Agent, or Firm* — Simpson & Simpson, PLLC

(57) ABSTRACT

A camshaft phaser, including: a stator including radially inwardly extending protrusions with radially outermost ends; a rotor including radially outwardly extending protrusions radially outermost ends; chambers at least partially bounded by a inwardly extending protrusion and an outwardly extending protrusion; first seals disposed in the radially innermost ends and facing the rotor; second seals disposed in the radially outermost ends and facing the stator; first and second wedge plates radially disposed between the rotor and the stator; and a displacement assembly arranged to for an advance mode, displace the first wedge plate to enable rotation of the rotor, with respect to the stator, in the first circumferential direction and for a retard mode, displace the second wedge plate to enable rotation of the rotor, with respect to the stator, in a second circumferential direction opposite the first circumferential direction.

20 Claims, 11 Drawing Sheets

MULTI-POSITION CAMSHAFT PHASER WITH TWO ONE-WAY WEDGE CLUTCHES AND VISCOUS DAMPING

TECHNICAL FIELD

The present disclosure relates to a multi-position camshaft phaser with two one-way wedge clutches including viscous and coulomb damping. The two one-way wedge clutches are used to advance and retard the phase of the rotor with respect to the stator.

BACKGROUND

A camshaft phaser using two one-way wedge clutches to control phasing of a rotor with respect to a stator is known. However, the rotor can shift with respect to the stator at rotational speeds that are excessive; high enough to create problems with respect to positioning the rotor.

SUMMARY

According to aspects illustrated herein, there is provided a camshaft phaser, including: a stator arranged to receive torque from an engine and including a plurality of radially inwardly extending protrusions, each radially inwardly extending protrusion including a radially outermost end; a rotor arranged to be non-rotatably connected to a camshaft and including a plurality of radially outwardly extending protrusions, each radially outwardly extending protrusion including a radially outermost end; a plurality of chambers, each chamber at least partially bounded by a respective radially inwardly extending protrusion and a respective radially outwardly extending protrusion circumferentially adjacent to the radially inwardly extending protrusion; a first plurality of seals, each seal in the first plurality of seals disposed in a respective radially innermost end and facing the rotor in a first radial direction; a second plurality of seals, each seal in the second plurality of seals disposed in a respective radially outermost end and facing the stator in a second radial direction opposite the first radial direction; first and second wedge plates radially disposed between the rotor and the stator; and a displacement assembly arranged to for an advance mode, displace the first wedge plate to enable rotation of the rotor, with respect to the stator, in the first circumferential direction and for a retard mode, displace the second wedge plate to enable rotation of the rotor, with respect to the stator, in a second circumferential direction opposite the first circumferential direction.

According to aspects illustrated herein, there is provided a camshaft assembly, including: a stator arranged to receive torque from an engine and including a plurality of radially inwardly extending protrusions; a rotor arranged to be non-rotatably connected to a camshaft and including a plurality of radially outwardly extending protrusions; a plurality of chambers, each chamber at least partially bounded by a respective radially inwardly extending protrusion and a respective radially outwardly extending protrusion circumferentially adjacent to the radially inwardly extending protrusion; a plurality of channels through the rotor, each channel leading to a respective chamber; a respective check valve between said each channel and the respective chamber; a first plurality of seals, each seal in the first plurality of seals radially disposed between the rotor and a respective radially inwardly extending protrusion; a second plurality of seals, each seal in the second plurality of seals radially disposed between the stator and a respective radially outwardly extending protrusion; first and second wedge plates radially disposed between the rotor and the stator; and a displacement assembly arranged to for an advance mode, displace the first wedge plate to enable rotation of the rotor, with respect to the stator, in a first circumferential direction and for a retard mode, displace the second wedge plate to enable rotation of the rotor, with respect to the stator, in a second circumferential direction opposite the first circumferential direction.

According to aspects illustrated herein, there is provided a method of operating a camshaft phaser including: a stator including a plurality of radially inwardly extending protrusions, each radially inwardly extending protrusion including a radially outermost end; a rotor including a plurality of radially outwardly extending protrusions; a plurality of chambers, each chamber at least partially bounded by a respective radially inwardly extending protrusion and a respective radially outwardly extending protrusion circumferentially adjacent to the radially inwardly extending protrusion; and a plurality of seals, each seal in the plurality of seals disposed in a respective radially innermost end and facing the rotor in a first radial direction, the method including: for each chamber in the plurality of pairs of chambers, flowing pressurized fluid, through a respective channel in the rotor, to said each chamber; receiving, with the stator, first torque in a first circumferential direction from an engine; and for an advance mode: receiving, with the rotor, second torque in the first circumferential direction; displacing a first wedge plate, radially disposed between the stator and the rotor, in the first circumferential direction; rotating the rotor, with respect to the stator, in the first circumferential direction; for a first chamber included in each pair of chambers, opposing the rotation of the rotor in the first circumferential direction with the pressurized fluid; and restricting flow, in the second circumferential direction, of the pressurized fluid out of the first chamber radially between a seal included in the plurality of seals and the rotor.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements of the disclosure. It is to be understood that the disclosure as claimed is not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the present disclosure.

Unless defined otherwise, all technical and scientific terms used herein have the same meaning as commonly understood to one of ordinary skill in the art to which this disclosure belongs. It should be understood that any methods, devices or materials similar or equivalent to those described herein can be used in the practice or testing of the disclosure.

Unless defined otherwise, all technical and scientific terms used herein have the same meaning as commonly understood to one of ordinary skill in the art to which this present disclosure belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

Figure 1:
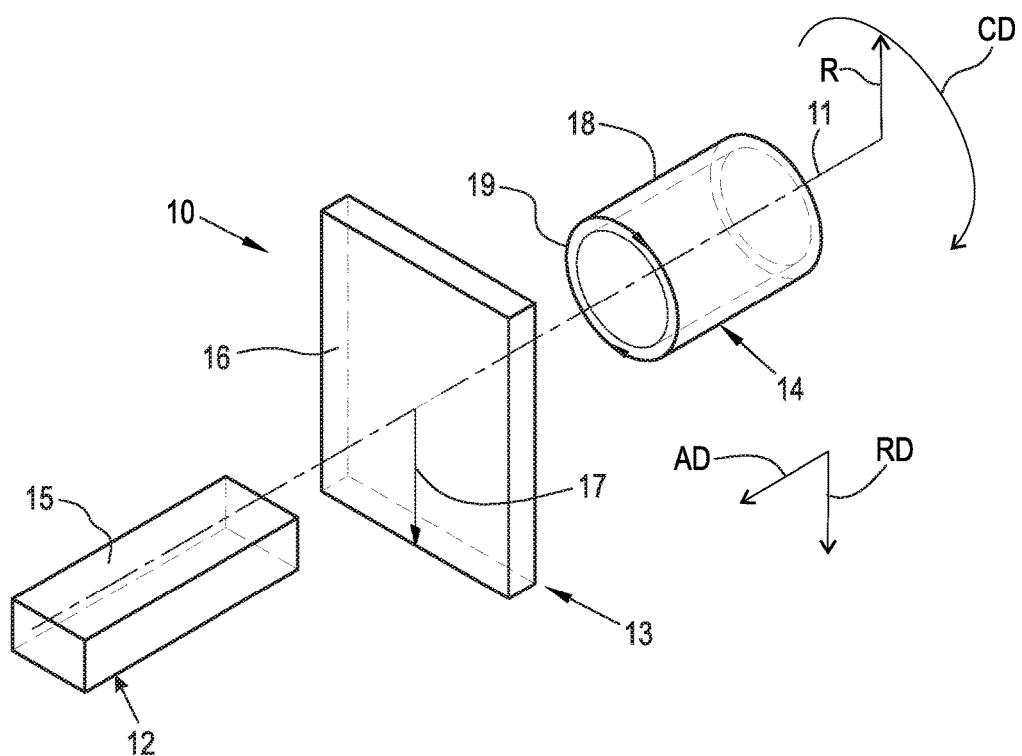
FIG. 1 is a perspective view of a cylindrical coordinate system demonstrating spatial terminology used in the present application.

FIG. 1 is a perspective view of cylindrical coordinate system 10 demonstrating spatial terminology used in the present application. The present application is at least partially described within the context of a cylindrical coordinate system. System 10 includes longitudinal axis 11, used as the reference for the directional and spatial terms that follow. Axial direction AD is parallel to axis 11. Radial direction RD is orthogonal to axis 11. Circumferential direction CD is defined by an endpoint of radius R (orthogonal to axis 11) rotated about axis 11.

To clarify the spatial terminology, objects 12, 13, and 14 are used. An axial surface, such as surface 15 of object 12, is formed by a plane co-planar with axis 11. Axis 11 passes through planar surface 15; however any planar surface co-planar with axis 11 is an axial surface. A radial surface, such as surface 16 of object 13, is formed by a plane orthogonal to axis 11 and co-planar with a radius, for example, radius 17. Radius 17 passes through planar surface 16; however any planar surface co-planar with radius 17 is a radial surface. Surface 18 of object 14 forms a circumferential, or cylindrical, surface. For example, circumference 19 is passes through surface 18. As a further example, axial movement is parallel to axis 11, radial movement is orthogonal to axis 11, and circumferential movement is parallel to circumference 19. Rotational movement is with respect to axis 11. The adverbs "axially," "radially," and "circumferentially" refer to orientations parallel to axis 11, radius 17, and circumference 19, respectively. For example, an axially disposed surface or edge extends in direction AD, a radially disposed surface or edge extends in direction R, and a circumferentially disposed surface or edge extends in direction CD.

Figure 2:
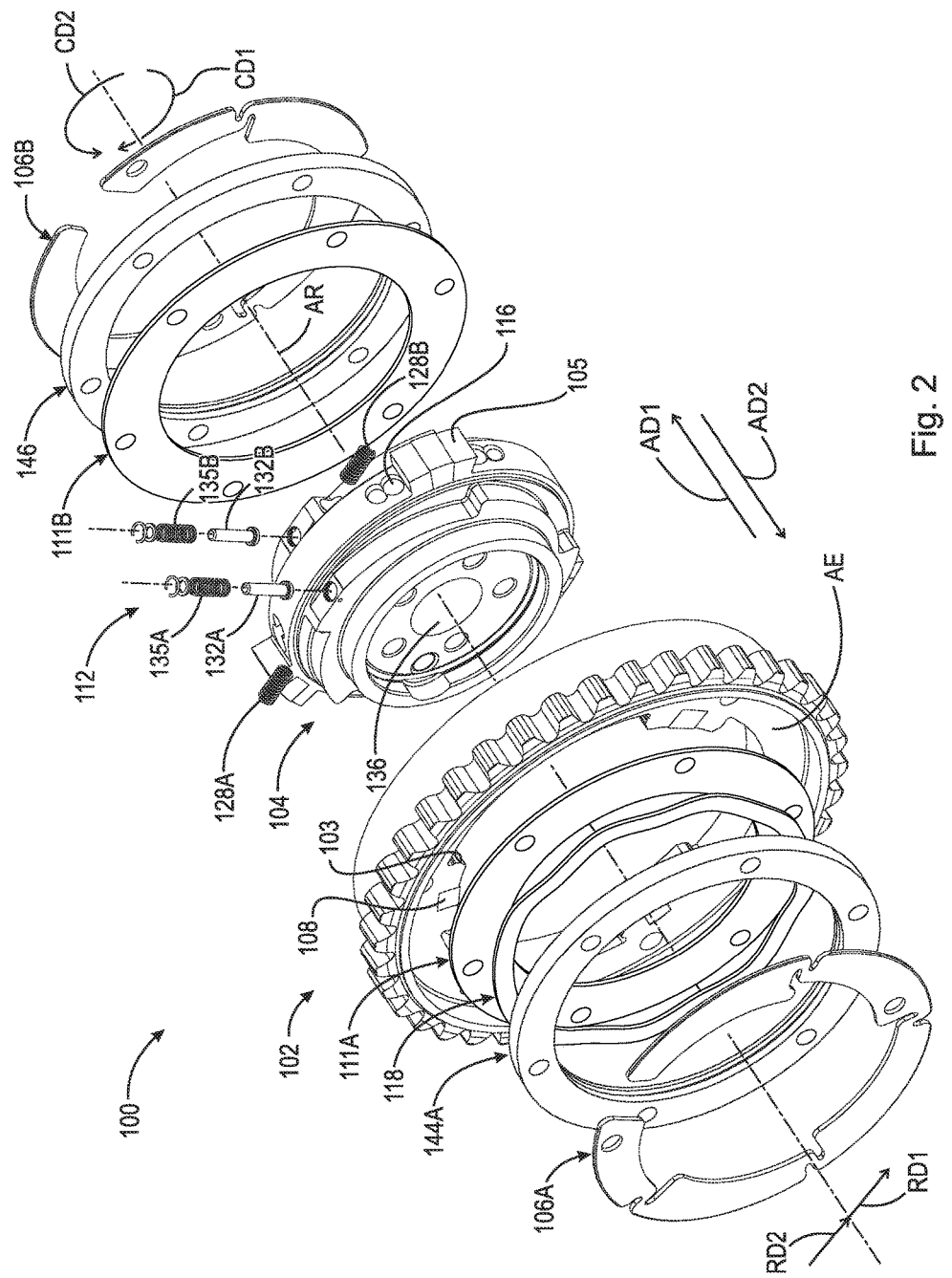
FIG. 2 is a perspective exploded view of a camshaft phaser with two-way wedge clutches and viscous damping.

FIG. 2 is a perspective exploded view of camshaft phaser 100 with two-way wedge clutches and viscous damping.

Figure 3:
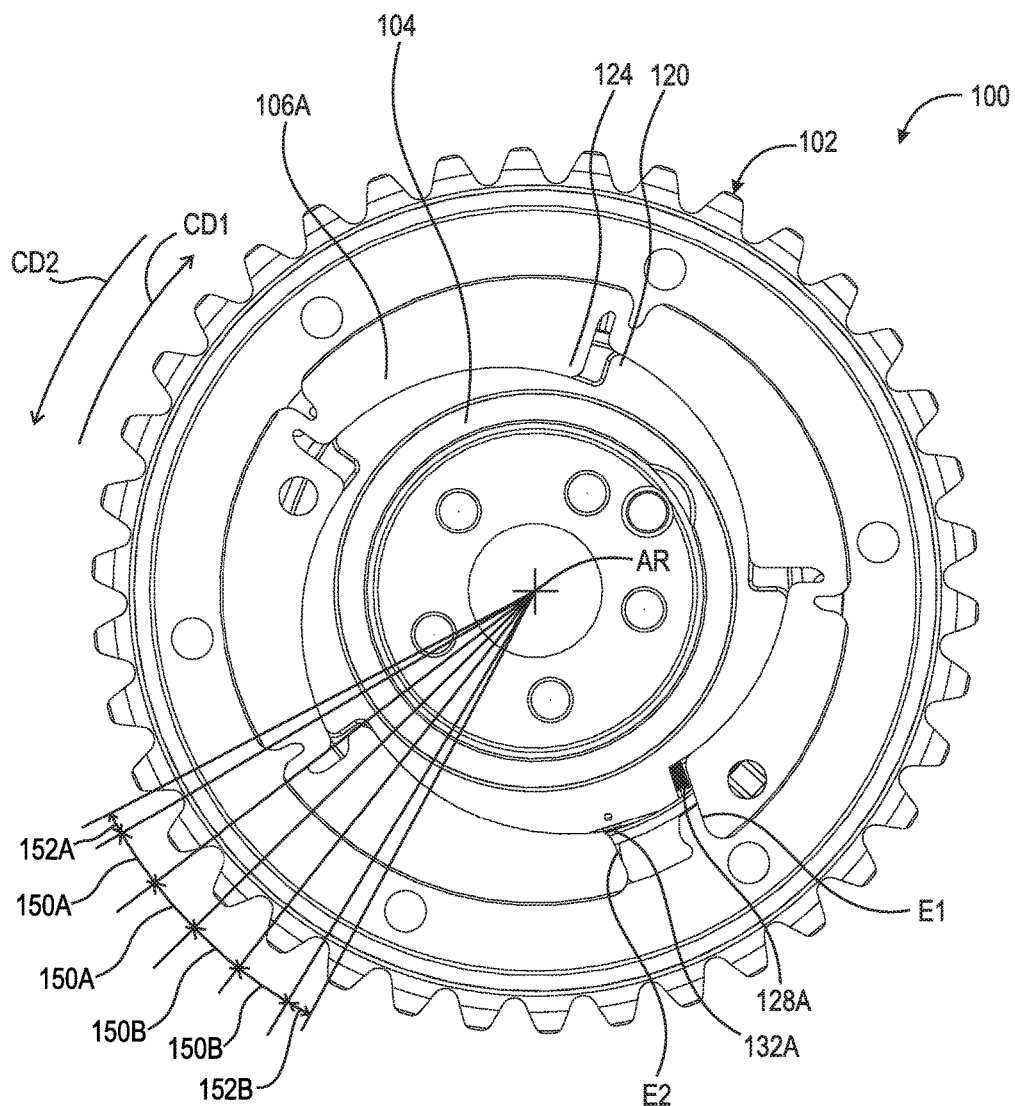
FIG. 3 is a front view of the camshaft phaser in FIG. 2.

FIG. 3 is a front view of camshaft phaser 100 in FIG. 2.

Figure 4:
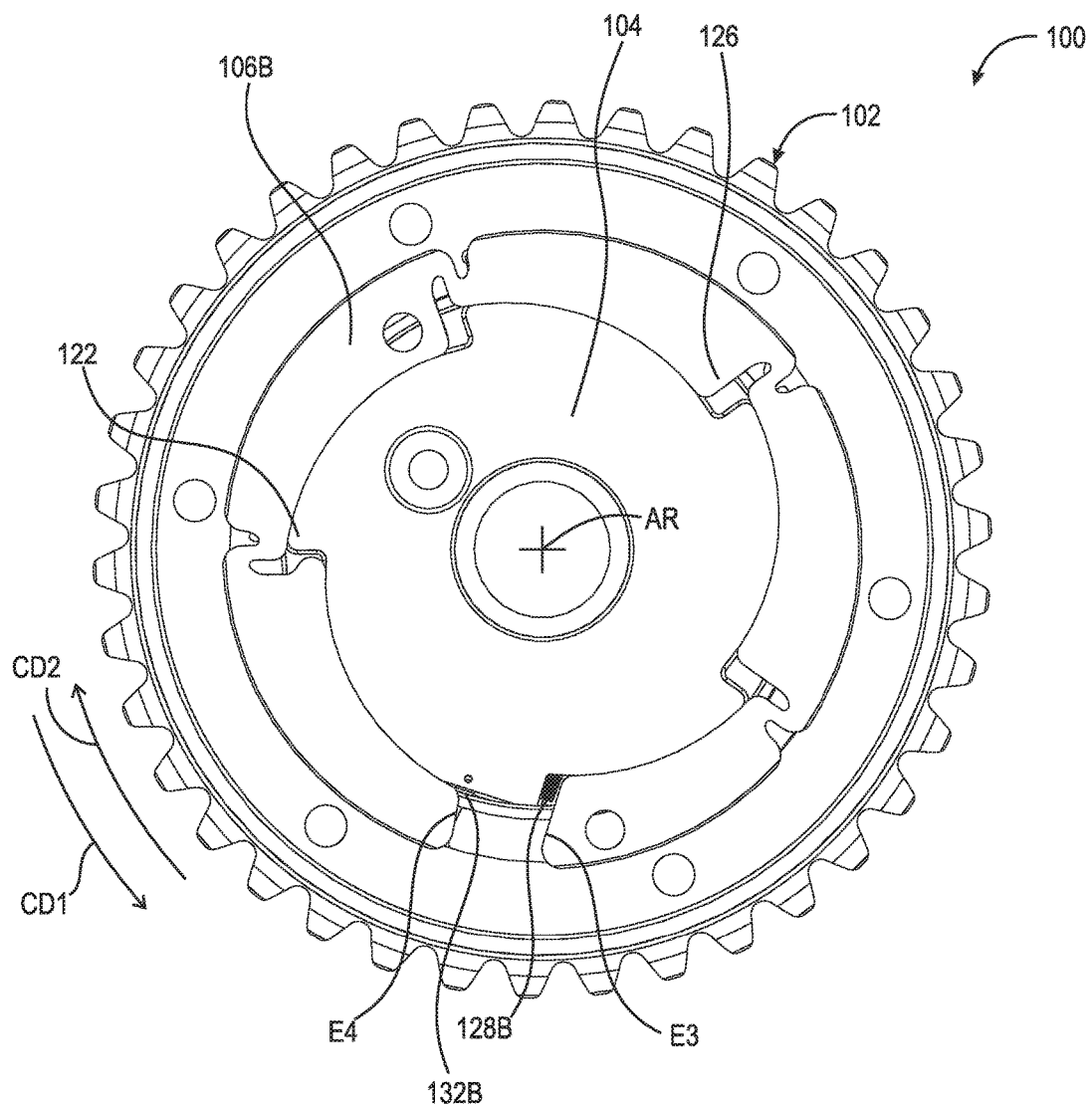
FIG. 4 is a rear view of the camshaft phaser in FIG. 2.

FIG. 4 is a rear view of camshaft phaser 100 in FIG. 2.

Figure 5:
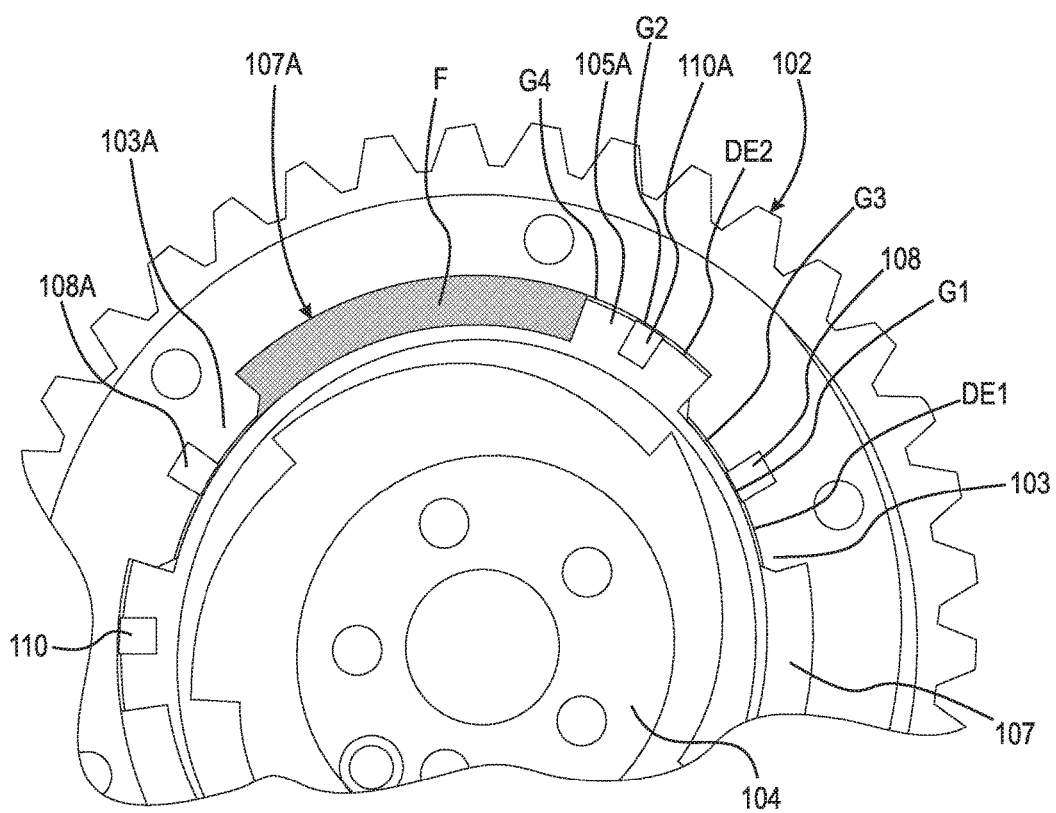
FIG. 5 is a front view of the rotor and stator in FIG. 2 showing chambers.

FIG. 5 is a front view of the rotor and stator in FIG. 2 showing chambers. The following should be viewed in light of FIGS. 2 through 5. Camshaft phaser 100 includes: axis of rotation AR; stator 102 arranged to receive torque from an engine (not shown) and including radially inwardly extending protrusions 103; rotor 104 arranged to be non-rotatably connect to a camshaft (not shown) and including radially outwardly extending protrusions 105; wedge plates 106A and 106B radially disposed between stator 102 and rotor 104; chambers 107; seals 108; and seals 110. Each chamber 107 is at least partially bounded by a protrusion 103 and a respective protrusion 105 circumferentially adjacent to the protrusion 103. For example, chamber 107A is bounded by protrusions 103A and 105A in opposite circumferential directions CD1 and CD2.

Each protrusion 103 includes radially inmost (distal) end DE1 and each protrusion 105 includes radially outermost (distal) end DE2. Each seal 108: is disposed in a respective end DE1; is radially located between end DE1 and rotor 104; and faces rotor 104 in radial direction RD2. Each seal 110: is disposed in a respective end DE2; is radially located between end DE2 and stator 102; and faces stator 102 in radial direction RD1. In an example embodiment, camshaft phaser 100 includes plates 111A and 111B bounding chambers 107 in axial directions AD1 and AD2. In an example embodiment, seals 108 are separated from rotor 104, in direction RD2, by gaps G1. In an example embodiment, seals 110 are separated from stator 102, in direction RD, by gaps G2. In an example embodiment (not shown), seals 108 are in contact rotor 102 and/or seals 110 are in contact with stator 102. Ends E1 are separated, in radial direction RD2, from rotor 104 by gaps G3. Ends E2 are separated, in radial direction RD1, from stator 102 by gaps G4.

Camshaft phaser 100 includes displacement assembly 112. For an advance mode, displacement assembly 112 is arranged to displace wedge plate 106A to enable rotation of rotor 104, with respect to stator 102, in circumferential direction CD1. For a retard mode, displacement assembly 112 is arranged to displace wedge plate 106B to enable rotation of rotor 104, with respect to stator 106, in circumferential direction CD2.

During use, fluid F, for example pressurized fluid F, is provided in chambers 107. To simplify presentation, fluid F is shown only in chamber 107A. However, it should be understood that all of chambers 107 can be provided with fluid F. Each seal 108 restricts leakage, in circumferential directions CD1 and CD2, of fluid F radially between a respective protrusion 103 and rotor 104. That is, seals 108 restrict flow through gaps G1 and G3. Each seal 110 restricts leakage, in circumferential directions CD1 and CD2, of fluid F radially between a respective protrusion 105 and stator 102. That is, seals 110 restrict flow through gaps G2 and G4. For example: seal 108A restricts leakage, in circumferential directions CD1 and CD2, of fluid F, from chamber 107A, radially between protrusion 103A and rotor 104; and seal 110A prevents leakage, in circumferential directions CD1 and CD2, of fluid F, from chamber 107A, radially between protrusion 105A and stator 102. In an example embodiment (not shown): each seal 108 blocks leakage, in circumferential directions CD1 and CD2, of fluid F radially between a respective protrusion 103 and rotor 104; and each seal 110 blocks leakage, in circumferential directions CD1 and CD2, of fluid F radially between a respective protrusion 105 and stator 102.

Figure 6:
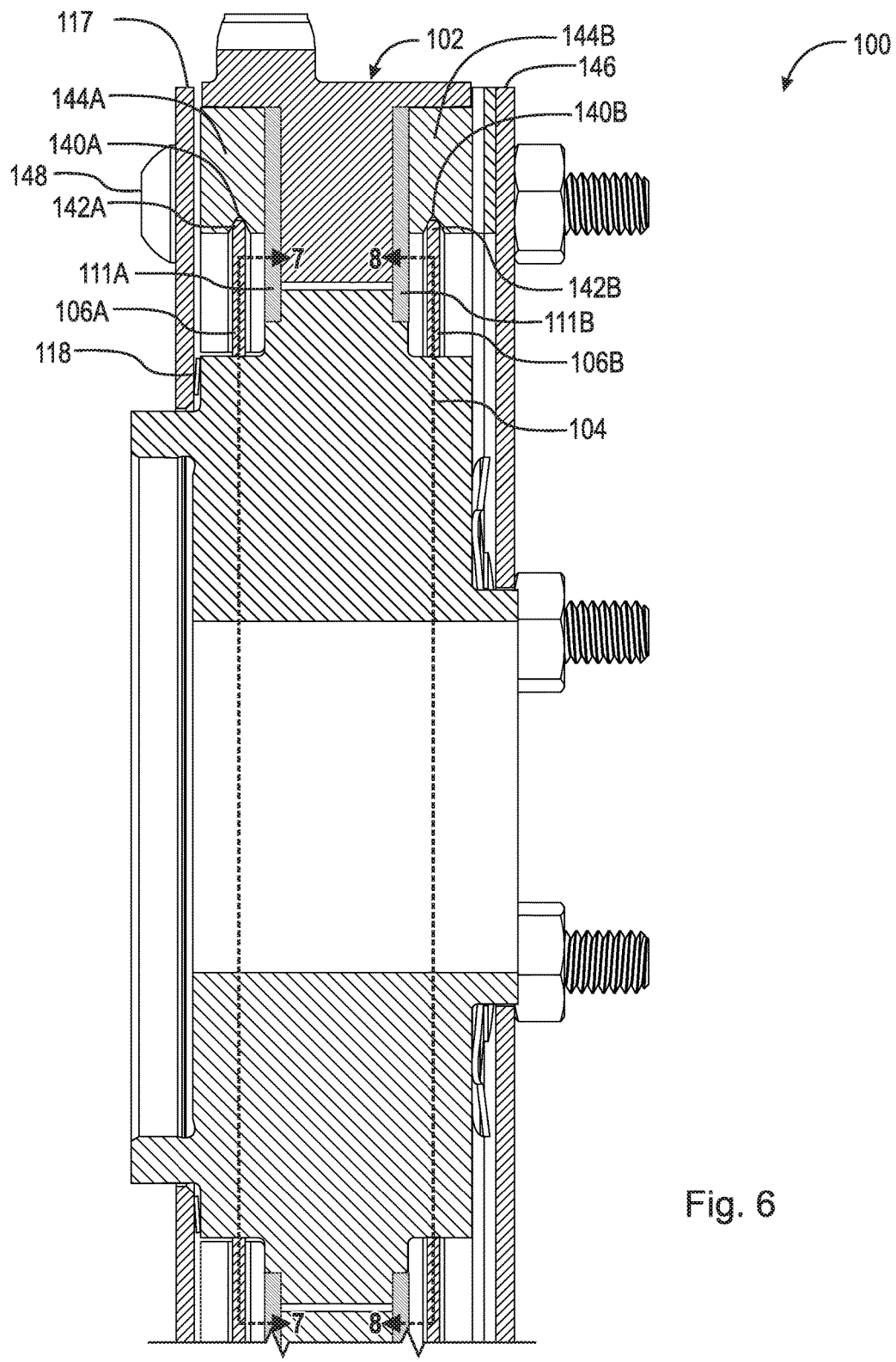
FIG. 6 is a cross-sectional view of the camshaft phaser in FIG. 2.

FIG. 6 is a cross-sectional view of camshaft phaser 100 in FIG. 2.

Figure 7:
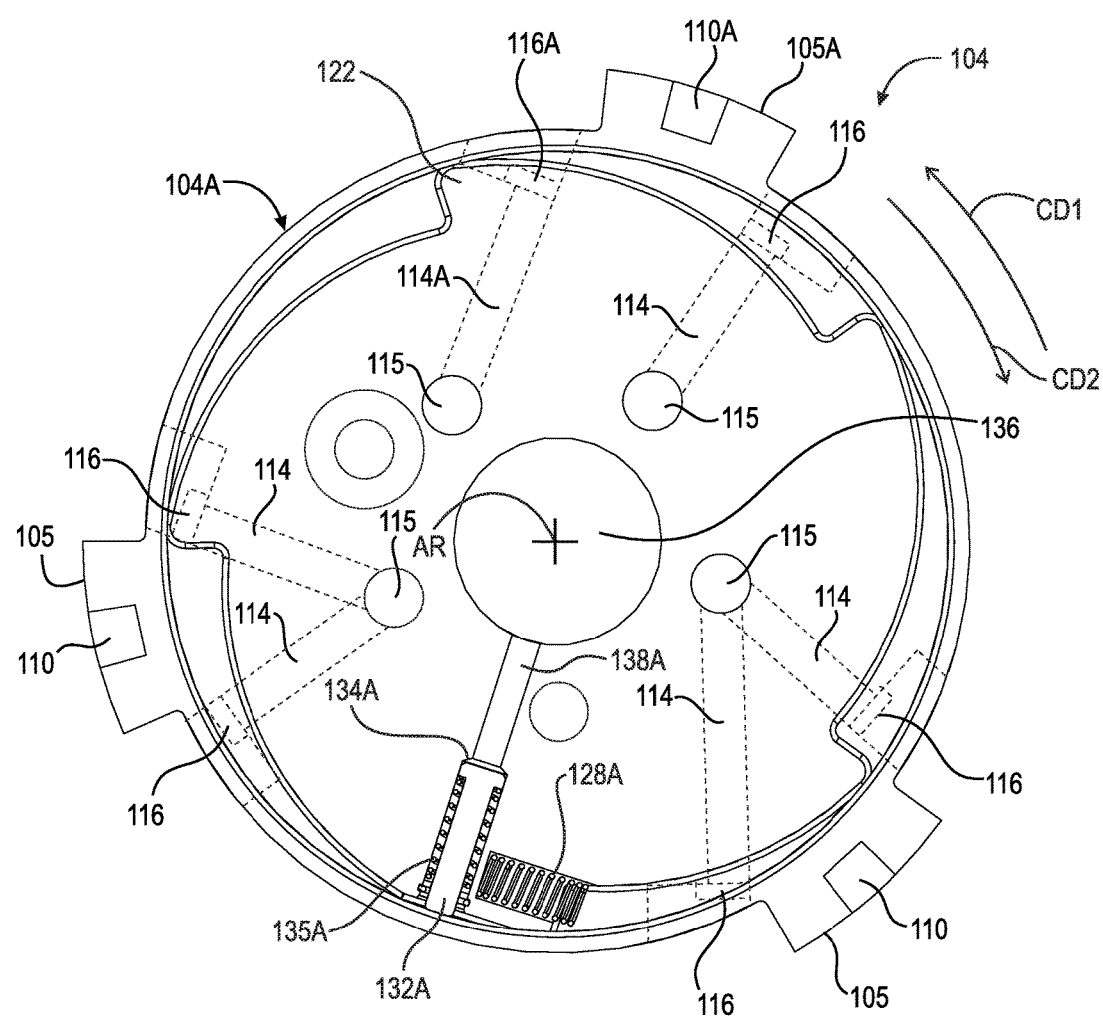
FIG. 7 is a cross-sectional view generally along line 7-7 in FIG. 6.

FIG. 7 is a cross-sectional view generally along line 7-7 in FIG. 6.

Figure 8:
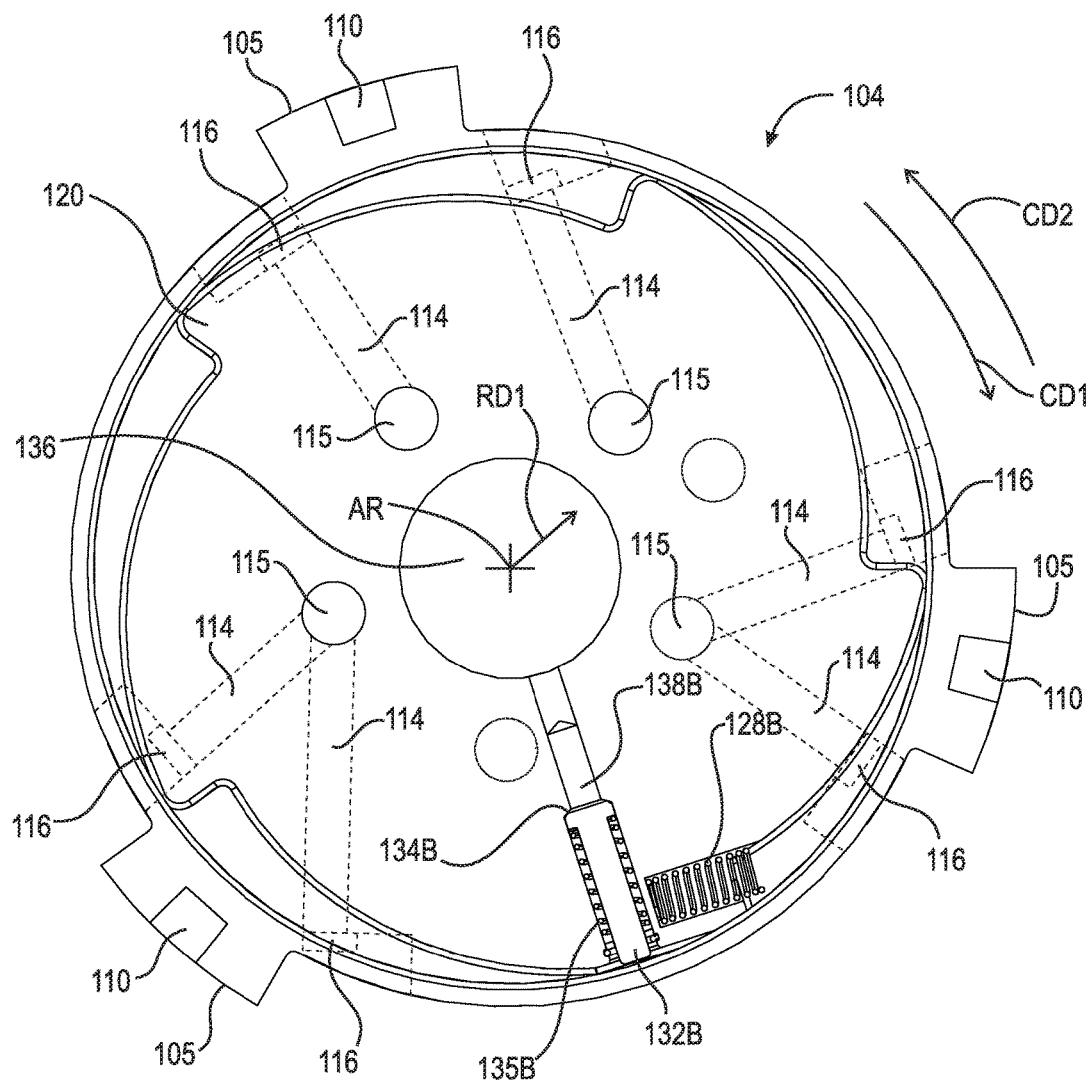
FIG. 8 is a cross-sectional view generally along line 8-8 in FIG. 6.

FIG. 8 is a cross-sectional view generally along line 8-8 in FIG. 6. The following should be viewed in light of FIGS. 2 through 8. Phaser 100 includes channels 114 and check valves 116. Channels 114 are in rotor 104 and pass through rotor 104. Each channel 114 leads to a respective chamber 107. For example, channel 114A leads to chamber 107A. A respective check valve 116 is located between each chamber 107 and the channel 114 leading to the chamber 107. For example, check valve 116A is located between channel 114A and chamber 107A. Check valves 116 enable flow of fluid F into chambers 107 and prevent the flow of fluid F from chambers 107 through channels 114. Check valves 116 can be any check valve known in the art, for example, reed valves.

Channels 114 are arranged to receive fluid F, for example through channels 115 connected to a source of pressurized fluid, at a first pressure. Note that a channel 115 can be connected to one channel 114 or to multiple channels 114. Check valves 116 are arranged to open to enable flow of pressurized fluid F into chambers 107 for pressure of fluid F in chambers 107 less than the first pressure. As noted above, fluid F can leak out of chambers 107 through gaps G1 and G2. Thus, if the leakage results in the lowering of fluid pressure in the chambers to a level below a desired level (the first pressure noted above), channels 114 replenish pressurized fluid F in chambers 107.

In an example embodiment, camshaft phaser 100 includes cover plate 117 and resilient element 118. Cover plate 117 is fixedly secured to axial end AE of stator 102. Resilient element 118 is axially disposed between cover plate 117 and rotor 104 and is in contact with cover plate 117 and rotor 104. Resilient element 118 reacts against cover plate 117 and rotor 104 to oppose rotation of rotor 104 with respect to stator 102. That is, element 118 provides coulomb, or frictional, damping between rotor 104 and stator 102.

For the advance mode, displacement assembly 112 is arranged to displace wedge plate 106A in circumferential direction CD1 to enable rotation of rotor 104, with respect to stator 102, in circumferential direction CD1. For the retard mode, displacement assembly 112 is arranged to displace wedge plate 106B in circumferential direction CD2 to enable rotation of rotor 104, with respect to stator 102, in circumferential direction CD2. To block rotation of rotor 104, with respect to stator 102, in circumferential direction CD2, for example during the advance mode, displacement assembly 112 is arranged to non-rotatably connect rotor 104, wedge plate 106B, and stator 102. To block rotation of rotor 104, with respect to stator 102, in circumferential direction CD1, for example during the retard mode, displacement assembly 112 is arranged to non-rotatably connect rotor 104, wedge plate 106A, and stator 102.

Figure 9:
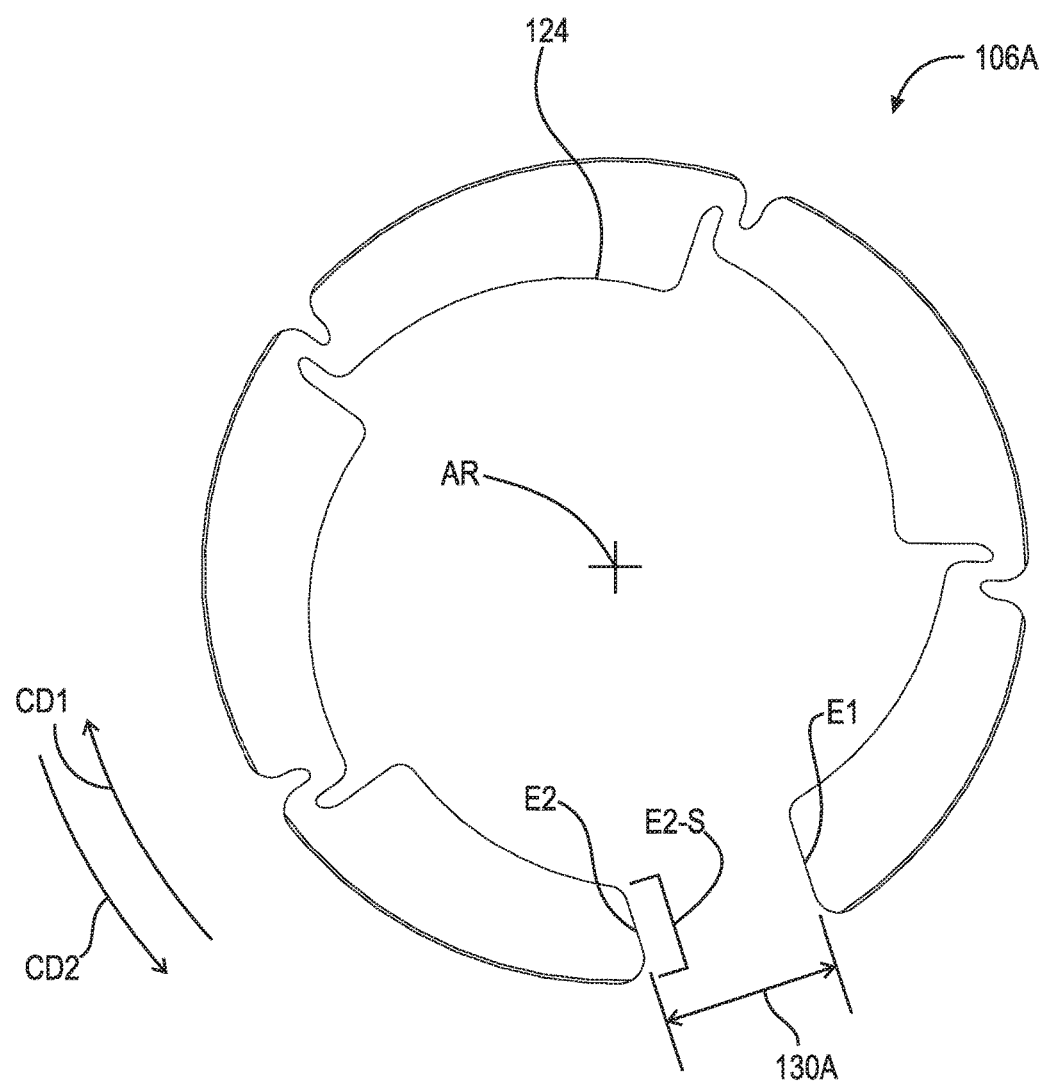
FIG. 9 is a front view of the wedge plate shown in FIG. 3.

FIG. 9 is a front view of wedge plate 106A shown in FIG. 3.

Figure 10:
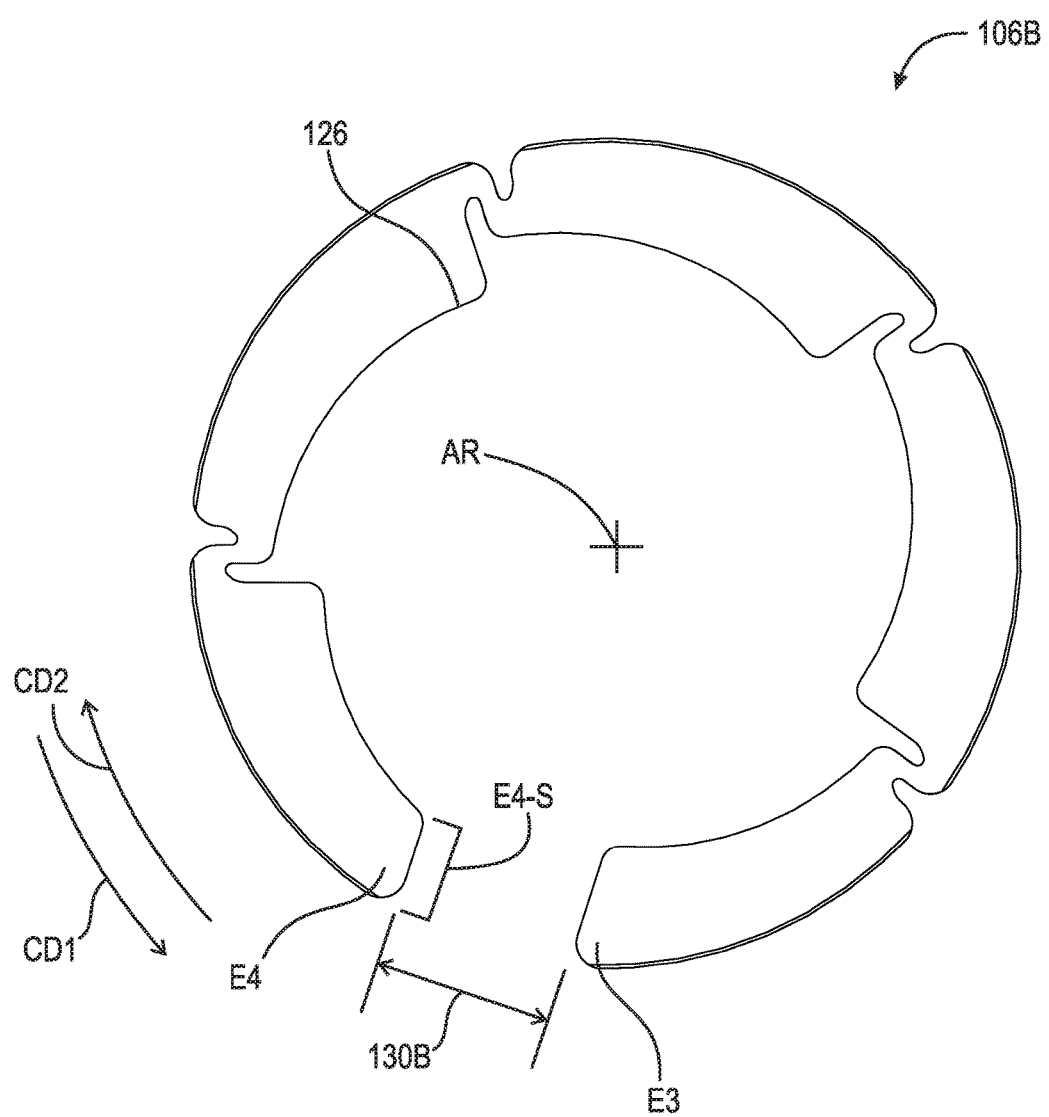
FIG. 10 is a rear view of the wedge plate shown in FIG. 4.

FIG. 10 is a rear view of wedge plate 106B shown in FIG. 4. The following should be viewed in light of FIGS. 2 through 10. In an example embodiment, rotor 104 includes ramps 120 and 122 and wedge plates 106A and 106B includes ramps 124 and 126, respectively. Ramps 120 are engaged with ramps 124 and ramps 122 are engaged with ramps 126. In an example embodiment, for the advance mode: ramps 120 are arranged to slide along ramps 124 in circumferential direction CD1; and displacement assembly 112 is arranged to slide ramps 126 along ramps 122 in circumferential direction CD1. In an example embodiment, for the retard mode: ramps 122 are arranged to slide along ramps 126 in circumferential direction CD2; and displacement assembly 112 is arranged to slide ramps 124 along ramps 120 in circumferential direction CD2.

The following provides further detail regarding an example embodiment of phaser 100 and displacement assembly 112. Displacement assembly 112 includes resilient elements 128A and 1218B. Resilient element 128A is circumferentially disposed between rotor 104 and wedge plate 106A and is arranged to displace wedge plate 106A in circumferential direction CD2 with respect to the rotor. Resilient element 128B is circumferentially disposed between rotor 104 and wedge plate 106B and is arranged to displace wedge plate 106B in circumferential direction CD1 with respect to the rotor.

For the advance mode, resilient element 128B is arranged to displace wedge plate 106B in circumferential direction CD1 to block rotation of rotor 104, with respect to stator 102, circumferential direction CD2 and eliminate back lash. For the retard mode, resilient element 128A is arranged to displace wedge plate 106A in circumferential direction CD2 to block rotation of rotor 104, with respect to stator 102, circumferential direction CD1 and eliminate back lash.

In an example embodiment: wedge plate 106A includes circumferential ends E1 and E2 separated by gap 130A in circumferential direction CD1; and wedge plate 106B includes circumferential ends E3 and E4 separated by gap 130B in circumferential direction CD1. Resilient elements 128A and 128B are engaged with circumferential ends E1 and E3, respectively.

Displacement assembly 112 includes pins 132A and 132B in chambers 134A and 134B, respectively, in rotor 104. Pins 132A and 132B are at least partially located in chambers 134A and 134B, respectively. Springs 135A and 135B, respectively, urge pins 132A and 132B in radially inward direction RD2. Further, rotor 104 includes: central opening 136 through which axis of rotation AR for camshaft phaser 100 passes. Assembly 112 includes: channel 138A in rotor 104 connecting opening 136 and chamber 134A; and channel 138B in rotor 104 connecting opening 136 and 134B.

Channels 138A and 138B are arranged to receive pressurized fluid. For the advance mode, the pressurized fluid is arranged to displace pin 132A in radially outward direction RD1 to displace end E2 in circumferential direction CD1. For the retard mode, the pressurized fluid is arranged to displace pin 132B in radially outward direction RD1 to displace end E4 in circumferential direction CD2. Springs 135A and 135B urge pins out of contact with ends E2 and E4, respectively, in the absence of pressurized fluid in channels 138A and 138B. Thus, in the absence of the pressurized fluid, pins 132A and 132B do not interfere with rotation of wedge plates 106A and 106B, respectively.

Ends E2 and E4 include slopes, or sloped portions, E2-S and E4-S, respectively. In an example embodiment, sloped portions E2-S and E4-S include all of E2-S and E4-S, respectively. Along radially outward direction RD1, slope E2-S extends further in circumferential direction CD2. Along radially outward direction RD1, slope E4-S extends further in circumferential direction CD1. Thus: as pin 132A extends in direction RD1, pin 132A slides along slope E2-S, pushing wedge plate 106A in direction CD1; as pin 132B extends in direction RD1, pin 132B slides along slope E4-S, pushing wedge plate 106B in direction CD2.

Figure 11:
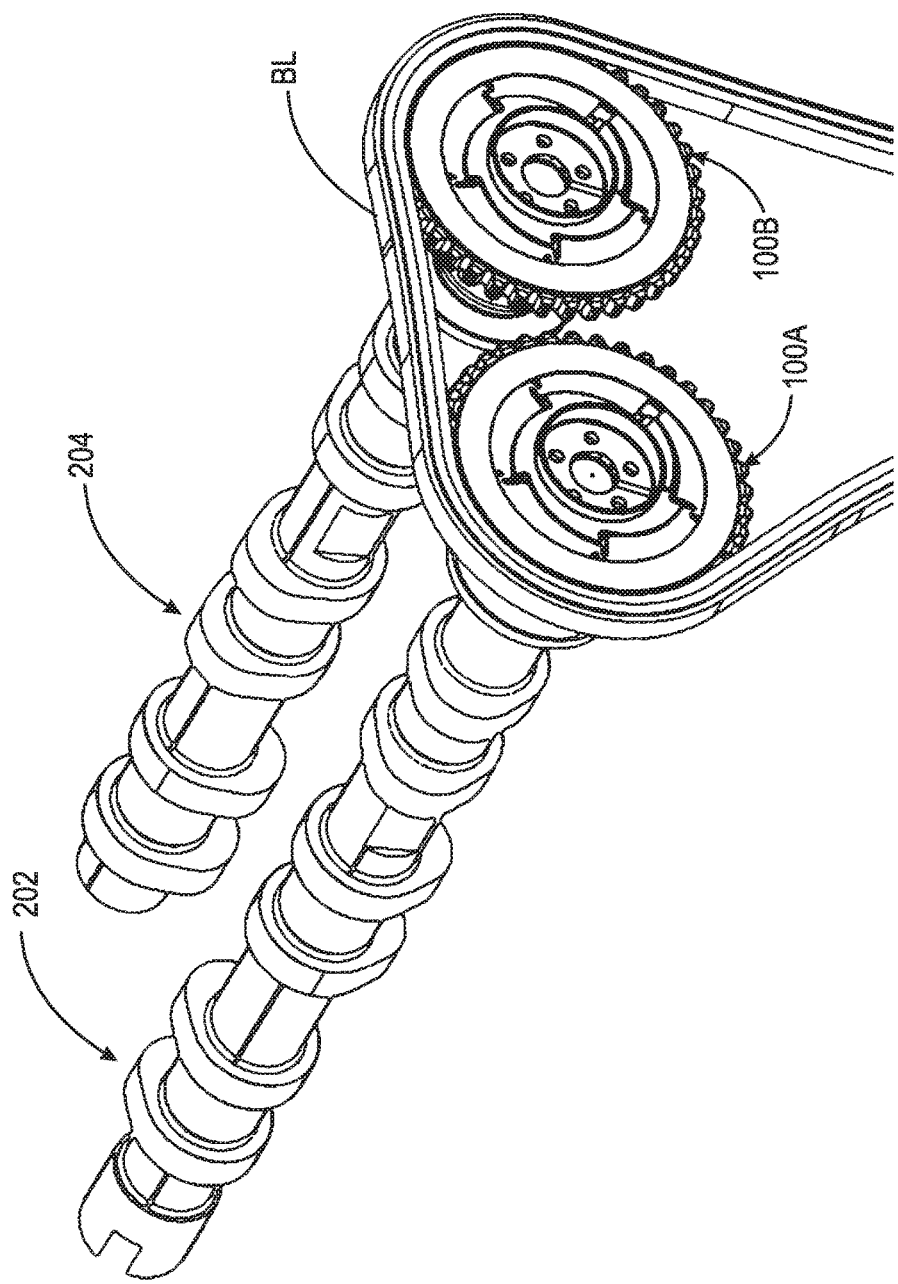
FIG. 11 is a perspective view of camshaft phasers connected to respective cam shafts.

FIG. 11 is a cross-sectional view generally along line 11-11 in FIG. 3 with side plates added. The following should be viewed in light of FIGS. 2 through 11. In an example embodiment, phaser 100 includes circumferentially disposed grooves 140A and 140B and wedge plates 106A and 106B include chamfered radially outer portions 142A and 142B. In an example embodiment, phaser 100 includes groove plates 144A and 144B with grooves 140A and 140B, respectively. Plates 144A and 144B are fixedly connected to stator 102, for example by side plates 117 and 146, respectively, and bolts 148. Portions 142A and 142B are frictionally engaged with grooves 140A and 140B so that wedge plates 106A and 106B rotate with stator 102 except as noted above and below. As wedge plate 106A is displaced radially outward as described above, portion 142A compressively engages groove 140A, non-rotatably connecting stator 102 and wedge plate 106A. As wedge plate 106B is displaced radially outward as described above, portion 142B compressively engages groove 140B, non-rotatably connecting stator 102 and wedge plate 106B.

FIG. 12 is a perspective view of camshaft phasers 100A and 100B connected to cam shafts 202 and 204, respectively. The discussion regarding phaser 100 is applicable to phasers 100A and 100B. Typically, one of cam shafts 202 and 204 is for an intake valve train and the other of cam shafts 202 and 204 is for an exhaust valve train. Phasers 100A and 100B are rotated by chain (simplified chain model—chain sprockets are shown) BL, typically driven by a crankshaft for an engine of which the camshafts and phasers are a part. The following discussion is directed to phaser 100A; however, it should be understood that the discussion is applicable to phaser 100B as well.

In the discussion that follows, stator 102 rotates in direction CD1 in response to torque from chain BL. As is known in the art, torsional forces T1 and T2 are transmitted from camshaft 202, in directions CD1 and CD2, respectively, to rotor 104 during operation of phaser 100. The torsional force forces are due to interaction of cam lobes (not shown) on camshaft 202 with various components of a valve train (not shown) of which camshaft 202 is a part. Torsional forces T1 and T2 are transmitted in a repeating cycle. Rotor 104 rotates in direction CD1; however, torsional force T1 urges rotor 104 in direction CD1 with respect to the stator and torsional force T2 urges rotor 104 in direction CD2 with respect to the stator.

The following describes the advance mode. Assume stator 102 is rotating in direction CD1 and phaser 100A receives torsional force T1. Fluid PF in channel 138A urges pin 132A in direction CD1 to displace wedge plate 106A is direction CD1. Ramps 124 slide down ramps 120, and rotor 104 displaces distance 150A in direction CD1. At the same time, the rotation of rotor 104 causes ramps 122 to slide down ramps 126, that is, wedge plate 106B does not block the rotation of the rotor.

The rotor then receives torque T2 and the pressurized fluid is drained from channel 138A. Torque T2 on rotor 104 urges the rotor in direction CD2. At the same time, wedge plate 106B is urged in direction CD1 by resilient element 128B. As a result, as soon as the rotor receives torque T2, ramps 126 slide up ramps 122 to non-rotatably connect the rotor and the stator. That is, resilient element 128B eliminates backlash in the transition from torque T1 to torque T2. Thus, rotor 104 is prevented from rotating back in direction CD2, which would cancel the displacement in distance 150A. Therefore, in the advance mode, for each cycle of torques T1 and T2, rotor 104 rotates distance 150A in direction CD1. For successive cycles of T1 and T2 in the advance mode, rotor 104 displaces distance 150A, with respect to stator 102, in direction CD1. That is, this process is repeatable via successive cycles of torsional forces T1 and T2 to attain a desired shift of rotor 104.

The following describes the retard mode. Assume stator 102 is rotating in direction CD1 and phaser 100A receives torsional force T2. Fluid PF in channel 138B urges pin 132B in direction CD2 to displace wedge plate 106B is direction CD2. Ramps 122 slide down ramps 126, and rotor 104 displaces distance 150B in direction CD2. At the same time, the rotation of rotor 104 causes ramps 120 to slide down ramps 124, that is, wedge plate 106A does not block the rotation of the rotor.

The rotor then receives torque T1 and the pressurized fluid is drained from channel 138B. Torque T1 on rotor 104 urges the rotor in direction CD1. At the same time, wedge plate 106A is urged in direction CD2 by resilient element 128A. As a result, as soon as the rotor receives torque T1, ramps 124 slide up ramps 120 to non-rotatably connect the rotor and the stator. That is, resilient element 128A eliminates backlash in the transition from torque T2 to torque T1. Thus, rotor 104 is prevented from rotating back in direction CD1, which would cancel the displacement in distance 150B. Therefore, in the advance mode, for each cycle of torques T1 and T2, rotor 104 rotates distance 150B in direction CD2. For successive cycles of T1 and T2 in the advance mode, rotor 104 displaces distance 150B, with respect to stator 102, in direction CD2. That is, this process is repeatable via successive cycles of torsional forces T1 and T2 to attain a desired shift of rotor 104.

Each distance 150A is a result of phaser 100A implementing a full cycle of torsional force forces T1 and T2. To shift rotor 104 in direction CD1 by distance 152A, less than distance 150A, pressurized fluid PF is drained from channel 138A after rotor 104 has begun rotation in direction CD1 (by distance 152A) but before rotor 104 has rotated distance 150A.

Each distance 150B is a result of phaser 100A implementing a full cycle of torsional force forces T1 and T2. To shift rotor 104 in direction CD2 by distance 152B, less than distance 150B, pressurized fluid PF is drained from channel 138B after rotor 104 has begun rotation in direction CD2 (by distance 152B), but before rotor 104 has rotated distance 150B.

Thus, rotor 104 can be controllably and repeatably rotated virtually any amount with respect to stator 102 in the advance and retard modes.

The following should be viewed in light of FIGS. 2 through 11. The following describes a method for operating a camshaft phaser including: a stator including a plurality of radially inwardly extending protrusions, each radially inwardly extending protrusion including a radially outermost end; a rotor including a plurality of radially outwardly extending protrusions; a plurality of chambers, each chamber at least partially bounded by a respective radially inwardly extending protrusion and a respective radially outwardly extending protrusion circumferentially adjacent to the radially inwardly extending protrusion; and a plurality of seals, each seal in the plurality of seals disposed in a respective radially innermost end and facing the rotor in a first radial direction. A first step, for each chamber in the plurality of pairs of chambers, flows pressurized fluid, through a respective channel in the rotor, to said each chamber. A second step receives, with the stator, first torque in a first circumferential direction from an engine; and for an advance mode: a third step receives, with the rotor, second torque in the first circumferential direction; a fourth step displaces a first wedge plate, radially disposed between the stator and the rotor, in the first circumferential direction; a fifth step rotates the rotor, with respect to the stator, in the first circumferential direction; for a first chamber included in each pair of chambers, a sixth step opposes the rotation of the rotor in the first circumferential direction with the pressurized fluid; and a seventh step restricts flow, in the second circumferential direction, of the pressurized fluid out of the first chamber radially between a seal included in the plurality of seals and the rotor.

For a retard mode: an eighth step receives, with the rotor, third torque in the second circumferential direction; a ninth step displaces a second wedge plate, radially disposed between the stator and the rotor, in the second circumferential direction; a tenth step rotates the rotor, with respect to the stator, in the second circumferential direction; an eleventh step, for the first chamber, opposes the rotation of the rotor in the second circumferential direction with the pressurized fluid; and a twelfth step restricts flow, in the first circumferential direction, of the pressurized fluid out of the first chamber radially between the seal included in the plurality of seals and the rotor.

In an example embodiment, for the advance mode: a thirteen step frictionally engages a resilient element with the rotor and a cover plate non-rotatably connected to the stator; and a fourteenth step opposes, with the frictional engagement, the rotation of the rotor in the first circumferential direction. In an example embodiment, for the retard mode: a fifteenth step frictionally engages the resilient element with the rotor and the cover plate non-rotatably connected to the stator; and a sixteenth step opposes, with the frictional engagement, the rotation of the rotor in the second circumferential direction.

Advantageously, camshaft phaser 100 and the method described above solve the problem noted above regarding the rotational speed of a rotor for a camshaft phaser during phasing of the rotor with respect to the stator. Specifically, during rotation of rotor 102 with respect to stator 102, seals 108 and 110 controllably restrict the flow of fluid F between chambers 107. The controlled leakage enables rotor 104 to rotate, but the speed of the rotation is limited by the leakage past seals 108 and 110. That is, rotation of rotor 104 is linked to the reduction of fluid volume in chambers 107 due to the leakage. Clearance between seals 108 and 110 and rotor 104 and stator 102, respectively, can be set to control the amount of leakage out of chambers 107 and hence the speed of rotation of rotor 104. As noted above, leaked fluid is replaced via channels 114.

It will be appreciated that various of the above-disclosed and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

What is claimed is:

1. A camshaft phaser, comprising:
    a stator arranged to receive torque from an engine and including a plurality of radially inwardly extending protrusions, each radially inwardly extending protrusion including a radially outermost end; a rotor arranged to be non-rotatably connected to a camshaft and including a plurality of radially outwardly extending protrusions, each radially outwardly extending protrusion including a radially outermost end;
    a plurality of chambers, each chamber at least partially bounded by a respective radially inwardly extending protrusion and a respective radially outwardly extending protrusion circumferentially adjacent to the radially inwardly extending protrusion;
    a first plurality of seals, each seal in the first plurality of seals disposed in a respective radially innermost end and facing the rotor in a first radial direction;
    a second plurality of seals, each seal in the second plurality of seals disposed in a respective radially outermost end and facing the stator in a second radial direction opposite the first radial direction;
    first and second wedge plates radially disposed between the rotor and the stator; and,
    a displacement assembly arranged to:
        for an advance mode, displace the first wedge plate to enable rotation of the rotor, with respect to the stator, in the first circumferential direction; and,
        for a retard mode, displace the second wedge plate to enable rotation of the rotor, with respect to the stator, in a second circumferential direction opposite the first circumferential direction.

2. The camshaft phaser of claim 1, wherein:
    said each seal in the first plurality of seals is separated, in the first radial direction, from the rotor by a first distance;
    each radially innermost end is separated, in the first radial direction, from the rotor by a second distance greater than the first distance;
    said each seal in the second plurality of seals is separated, in the second radial direction, from the stator by a third distance; and,
    each radially outermost end is separated, in the second radial direction, from the stator by a fourth distance greater than the third distance.

3. The camshaft phaser of claim 1, further comprising:
    respective fluid in said each chamber, wherein:
        said each seal in the first plurality of seals prevents flow of the respective fluid between the rotor and the respective radially inwardly extending protrusion; and,
        said each seal in the second plurality of seals prevents flow of the respective fluid between the stator and a respective radially inwardly extending protrusion.

4. The camshaft phaser of claim 1, further comprising:
    respective fluid in said each chamber, wherein:
        said each seal in the first plurality of seals restricts flow of the respective fluid between the rotor and the respective radially inwardly extending protrusion; and,
        said each seal in the second plurality of seals restricts flow of the respective fluid between the stator and a respective radially inwardly extending protrusion.

5. The camshaft phaser of claim 1, further comprising:
    a plurality of channels through the rotor, each channel leading to a respective chamber; and,
    a respective check valve between said each channel and the respective chamber.

6. The camshaft phaser of claim 5, wherein:
    the plurality of channels are arranged to receive pressurized fluid at a first pressure; and,
    each respective check valve is arranged to open to enable flow of the pressurized fluid into the respective chamber for pressure of the respective fluid less than the first pressure.

7. The camshaft phaser of claim 1, further comprising:
a cover plate fixedly secured to an axial end of the stator; and,
a resilient element axially disposed between the cover and the rotor and in contact with the cover and the rotor.

8. The camshaft phaser of claim 7, wherein the resilient element reacts against the cover and the rotor to oppose rotation of the rotor with respect to the stator.

9. The camshaft phaser of claim 1, wherein:
for the advance mode, the displacement assembly is arranged to displace the first wedge plate in the first circumferential direction to enable rotation of the rotor, with respect to the stator, in the first circumferential direction; and,
for the retard mode, the displacement assembly is arranged to displace the second wedge plate in the second circumferential direction to enable rotation of the rotor, with respect to the stator, in the second circumferential direction.

10. The camshaft phaser of claim 9, wherein:
to block rotation of the rotor, with respect to the stator, in the second circumferential direction, the displacement assembly is arranged to non-rotatably connect the rotor, the second wedge plate, and the stator; and,
to block rotation of the rotor, with respect to the stator, in the first circumferential direction, the displacement assembly is arranged to non-rotatably connect the rotor, the first wedge plate, and the stator.

11. The camshaft phaser of claim 1, wherein:
the rotor includes first and second pluralities of ramps, respectively;
the first and second wedge plates include third and fourth pluralities of ramps engaged with the third and fourth pluralities of ramps, respectively;
for the advance mode:
the first plurality of ramps are arranged to slide along the third plurality of ramps in the first circumferential direction; and,
the displacement assembly is arranged to slide the fourth plurality of ramps along the second plurality of ramps in the first circumferential direction; and,
for the retard mode:
the second plurality of ramps are arranged to slide along the fourth plurality of ramps in the second circumferential direction; and,
the displacement assembly is arranged to slide the third plurality of ramps along the first plurality of ramps in the second circumferential direction.

12. A camshaft phaser, comprising:
a stator arranged to receive torque from an engine and including a plurality of radially inwardly extending protrusions;
a rotor arranged to be non-rotatably connected to a camshaft and including a plurality of radially outwardly extending protrusions;
a plurality of chambers, each chamber at least partially bounded by a respective radially inwardly extending protrusion and a respective radially outwardly extending protrusion circumferentially adjacent to the radially inwardly extending protrusion;
a plurality of channels through the rotor, each channel leading to a respective chamber;
a respective check valve between said each channel and the respective chamber;
a first plurality of seals, each seal in the first plurality of seals radially disposed between the rotor and a respective radially inwardly extending protrusion;
a second plurality of seals, each seal in the second plurality of seals radially disposed between the stator and a respective radially outwardly extending protrusion;
first and second wedge plates radially disposed between the rotor and the stator; and,
a displacement assembly arranged to:
for an advance mode, displace the first wedge plate to enable rotation of the rotor, with respect to the stator, in a first circumferential direction; and,
for a retard mode, displace the second wedge plate to enable rotation of the rotor, with respect to the stator, in a second circumferential direction opposite the first circumferential direction.

13. The camshaft phaser of claim 12, further comprising:
respective fluid in said each chamber, wherein:
said each seal in the first plurality of seals restricts flow, in a circumferential direction, of the respective fluid between the rotor and the respective radially inwardly extending protrusion; and,
said each seal in the second plurality of seals restricts flow, in the circumferential direction, of the respective fluid between the stator and a respective radially outwardly extending protrusion.

14. The camshaft phaser of claim 12, wherein:
the plurality of channels are arranged to receive pressurized fluid at a first pressure; and,
each respective check valve is arranged to open to enable flow of the pressurized fluid into the respective chamber for pressure of the respective fluid less than the first pressure.

15. The camshaft phaser of claim 12, further comprising:
a cover plate fixedly secured to an axial end of the stator; and,
a resilient element axially disposed between the cover and the rotor and in contact with the cover and the rotor, wherein the resilient element reacts against the cover and the rotor to oppose rotation of the rotor with respect to the stator.

16. The camshaft phaser of claim 12, wherein:
for the advance mode, the displacement assembly is arranged to displace the first wedge plate in the first circumferential direction to enable rotation of the rotor, with respect to the stator, in the first circumferential direction; and,
for the retard mode, the displacement assembly is arranged to displace the second wedge plate in the second circumferential direction to enable rotation of the rotor, with respect to the stator, in the second circumferential direction.

17. The camshaft phaser of claim 12, wherein:
the rotor includes first and second pluralities of ramps, respectively;
the first and second wedge plates include third and fourth pluralities of ramps engaged with the third and fourth pluralities of ramps, respectively;
for the advance mode:
the first plurality of ramps are arranged to slide along the third plurality of ramps in a first circumferential direction; and,
the displacement assembly is arranged to slide the fourth plurality of ramps along the second plurality of ramps in the first circumferential direction; and, for the retard mode:
the second plurality of ramps are arranged to slide along the fourth plurality of ramps in a second circumferential direction, opposite the first circumferential direction; and,
the displacement assembly is arranged to slide the third plurality of ramps along the first plurality of ramps in the second circumferential direction.

18. A method of operating a camshaft phaser including: a stator including a plurality of radially inwardly extending protrusions, each radially inwardly extending protrusion including a radially outermost end; a rotor including a plurality of radially outwardly extending protrusions; a plurality of chambers, each chamber at least partially bounded by a respective radially inwardly extending protrusion and a respective radially outwardly extending protrusion circumferentially adjacent to the radially inwardly extending protrusion; and a plurality of seals, each seal in the plurality of seals disposed in a respective radially innermost end and facing the rotor in a first radial direction, the method comprising:
for each chamber in the plurality of pairs of chambers, flowing pressurized fluid, through a respective channel in the rotor, to said each chamber;
receiving, with the stator, first torque in a first circumferential direction from an engine; and,
for an advance mode:
receiving, with the rotor, second torque in the first circumferential direction;
displacing a first wedge plate, radially disposed between the stator and the rotor, in the first circumferential direction;
rotating the rotor, with respect to the stator, in the first circumferential direction;
for a first chamber included in each pair of chambers, opposing the rotation of the rotor in the first circumferential direction with the pressurized fluid; and,
restricting flow, in the second circumferential direction, of the pressurized fluid out of the first chamber radially between a seal included in the plurality of seals and the rotor.

19. The method of claim 18, further comprising:
for a retard mode:
receiving, with the rotor, third torque in the second circumferential direction;
displace a second wedge plate, radially disposed between the stator and the rotor, in the second circumferential direction;
rotating the rotor, with respect to the stator, in the second circumferential direction;
for the first chamber, opposing the rotation of the rotor in the second circumferential direction with the pressurized fluid; and,
restricting flow, in the first circumferential direction, of the pressurized fluid out of the first chamber radially between the seal included in the plurality of seals and the rotor.

20. The method of claim 18, further comprising:
for the advance mode:
frictionally engaging a resilient element with the rotor and a cover plate non-rotatably connected to the stator; and,
opposing, with the frictional engagement, the rotation of the rotor in the first circumferential direction; and,
for the retard mode:
frictionally engaging the resilient element with the rotor and the cover plate non-rotatably connected to the stator; and,
opposing, with the frictional engagement, the rotation of the rotor in the second circumferential direction.

* * * * *